J. F. Wachsmuth.
Method of Treating Paintings.

Nº 89,188.                    Patented Apr. 20, 1869.

Witnesses
Wm A Morgan
P. C. Dieterich

Inventor
J. F. Wachsmuth
per MMM & Co
Attorneys.

UNITED STATES PATENT OFFICE.

J. F. WACHSMUTH, OF HIGHLAND, ILLINOIS.

METHOD OF TRANSFERRING OIL-PAINTINGS FROM ONE SURFACE TO ANOTHER.

Specification forming part of Letters Patent No. 89,188, dated April 20, 1869.

*To all whom it may concern:*

Be it known that I, J. F. WACHSMUTH, of Highland, in the county of Madison and State of Illinois, have invented a new and Improved Process of Treating Paintings to make them Transferable from their Supports; and I do hereby declare that the following is a full, clear, and exact description thereof, which will enable others skilled in the art to make and use the same, reference being had to the accompanying drawings, forming part of this specification, in which—

Figure 1:
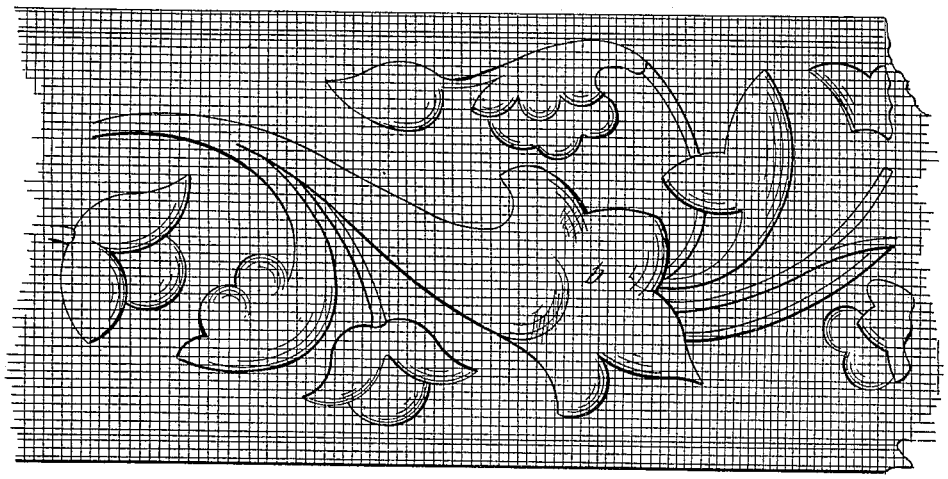
Figure 2:

Figure 1 represents a face view of a painted design, mounted on muslin, ready to be transferred to a wall, stone, or other surface. Fig. 2 is a sectional view of the same.

Similar letters of reference indicate corresponding parts.

This invention relates to a new process of applying oil or other paintings which have been produced at the artist's studio, or in any other suitable place, from their primary flexible support to any other suitable surface, such as marble or other stone, plaster, cement, wood, paper, iron, &c., for the purpose of doing away with the necessity of directly applying them to surfaces which are in inconvenient positions.

The following is a description of my process: A sheet of canvas, (paper may be used if the painting is to be small,) which is well stretched, is first treated in the following manner: Its surface is first covered with three consecutive coats of starch-glue. When the last coat is dry I apply to the same surface two or more coats of a mixture composed of gum-arabic and flaxseed, dissolved in water, in the proportions of one part of gum and flaxseed to eight parts of water. These two coats constitute the temporary adhesive medium for connecting the painting with the canvas.

The painting itself is applied upon this basis in three coats of oil-colors. The first coat should be very fat, and is composed of boiled linseed-oil and white lead. For painting in wax this coat is prepared by dissolving it in a water-bath with spirits of turpentine and caoutchouc, which imparts great elasticity. The other two coats may be less fat than the first. The second coat may receive spirits of turpentine, the quantity of which is further increased in the third and last coat, which addition removes luster or reflection from the painting.

In the above coats of paint no proportions can be given, as they depend upon and vary with the subject and design of each painting.

After the above operations are carried out, and after the painting is well dried and settled on the canvas, it is ready to be detached from it and transferred upon the secondary surface, from which it may be finally removed to be affixed to the surface which the painting is to adorn. To detach it I affix a piece of ordinary light muslin, *a*, or gauze upon the entire surface of the painting *b* by means of a paste, which is composed of one part of wheat-flour, dissolved in eight or ten parts of water, and allow it to dry. As soon as the paste is perfectly dried, so that the gauze or muslin adheres well, the rear side of the painting is moistened with clean water until the second series of coats (those consisting of gum-arabic and flaxseed) are dissolved, when the painting, which is well affixed to the muslin, comes off the canvas with perfect ease. It may then be rolled, transported, or folded without danger of breaking, and is perfectly elastic.

In order to fasten the painting to any surface on which it is permanently to remain, said surface is first covered with a coat of fat boiled oil, containing calcinated white lead, which renders the oil adhesive. The rear side of the detached painting is then applied upon this surface so prepared and adheres to it at once. The painting being thus fastened to the said surface, the muslin covering its surface is taken off by simply wetting it with a sponge, whereby it is caused to fall off by itself.

The operation is thus terminated. The painting, free from any luster or reflection of light, stands intimately connected with the substance of its basis, to which it has become chemically united. It therefore never breaks or cracks, and may be safely exposed on the outside of buildings for any length of time and during all kinds of weather.

By the process above described the tedious fresco and ceiling paintings can, in future, be dispensed with, the artist completes his work leisurely and conveniently at his studio, and, when finished, any common plasterer may attach it to its place of destination, where it remains solid and durable as long as the substance on whose surface it is affixed. Halls, rooms, cupolas, churches, &c., may thus be be easily decorated.

Having thus described my invention, I claim as new and desire to secure by Letters Patent—

The herein-described process of treating paintings, so that they may be transferred from the canvas or paper support to any other suitable surface, as specified.

J. F. WACHSMUTH.

Witnesses:
    AD. V. BANDELIN,
    ED. HUIGY.